US012606163B2

(12) United States Patent
Igari

(10) Patent No.: US 12,606,163 B2
(45) Date of Patent: Apr. 21, 2026

(54) CONTROLLER AND CONTROL METHOD

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 18/695,521

(22) PCT Filed: Sep. 28, 2022

(86) PCT No.: PCT/IB2022/059221
§ 371 (c)(1),
(2) Date: Nov. 20, 2024

(87) PCT Pub. No.: WO2023/053021
PCT Pub. Date: Apr. 6, 2023

(65) Prior Publication Data
US 2025/0162582 A1     May 22, 2025

(30) Foreign Application Priority Data

Sep. 28, 2021    (JP) ................................. 2021-157667

(51) Int. Cl.
*B60W 30/14*        (2006.01)
*B60W 10/18*        (2012.01)
                    (Continued)

(52) U.S. Cl.
CPC .......... *B60W 30/143* (2013.01); *B60W 10/18* (2013.01); *B60W 30/09* (2013.01);
                    (Continued)

(58) Field of Classification Search
CPC .... B60W 30/143; B60W 10/18; B60W 30/09; B60W 30/096; B60W 30/16;
                    (Continued)

(56) References Cited

U.S. PATENT DOCUMENTS

| | | | |
|---|---|---|---|
| 2021/0197816 A1* | 7/2021 | Horn | ........................ B62J 50/25 |
| 2022/0306101 A1* | 9/2022 | Nakagawara | ............ B62J 45/41 |
| 2024/0034428 A1* | 2/2024 | Pfau | ................. G08G 1/096725 |

FOREIGN PATENT DOCUMENTS

| | | |
|---|---|---|
| DE | 102017211886 A1 | 1/2019 |
| EP | 3604054 A1 | 2/2020 |

(Continued)

OTHER PUBLICATIONS

International Search Report and Written Opinion for Application No. PCT/IB2022/059221 dated Dec. 16, 2022 (9 pages).

*Primary Examiner* — Andrew Joseph Rudy
(74) *Attorney, Agent, or Firm* — Michael Best & Friedrich LLP

(57) ABSTRACT

The present disclosure obtains a controller and a control method capable of improving safety of a lean vehicle.

In a controller (30) and a control method according to the present disclosure, an execution section of the controller (30) executes a first operation as an operation that causes a lean vehicle (1) to execute a cruise control based on a positional relationship information between the lean vehicle (1) and a preceding vehicle preceding the lean vehicle (1). When a speed information, which is information about a speed of the lean vehicle (1) and is acquired during the first operation, indicates that the lean vehicle (1) is decelerated to a reference speed, the execution section executes, instead of the first operation, a second operation as an operation that causes the lean vehicle (1) to execute the cruise control regardless of the positional relationship information.

12 Claims, 3 Drawing Sheets

(51) Int. Cl.

| | |
|---|---|
| *B60W 30/09* | (2012.01) |
| *B60W 30/095* | (2012.01) |
| *B60W 30/16* | (2020.01) |
| *B60W 30/188* | (2012.01) |
| *B60W 50/00* | (2006.01) |

(52) U.S. Cl.

CPC ........ *B60W 30/0956* (2013.01); *B60W 30/16* (2013.01); *B60W 30/1884* (2013.01); *B60W 50/00* (2013.01); *B60W 2050/0083* (2013.01); *B60W 2300/36* (2013.01); *B60W 2420/905* (2013.01); *B60W 2510/1005* (2013.01); *B60W 2520/10* (2013.01); *B60W 2530/10* (2013.01); *B60W 2552/15* (2020.02); *B60W 2554/802* (2020.02)

(58) Field of Classification Search

CPC ......... B60W 30/301884; B60W 50/00; B60W 2050/0083; B60W 2300/36; B60W 2420/905; B60W 2510/1005; B60W 2520/10; B60W 2530/10; B60W 2552/15; B60W 2554/802

USPC ..................................................... 701/26, 93

See application file for complete search history.

(56) References Cited

FOREIGN PATENT DOCUMENTS

| | | |
|---|---|---|
| EP | 3605496 A1 | 2/2020 |
| EP | 4059796 A1 | 9/2022 |
| JP | 2009116882 A | 5/2009 |
| WO | 2021094877 A1 | 5/2021 |

* cited by examiner

[FIG. 1]
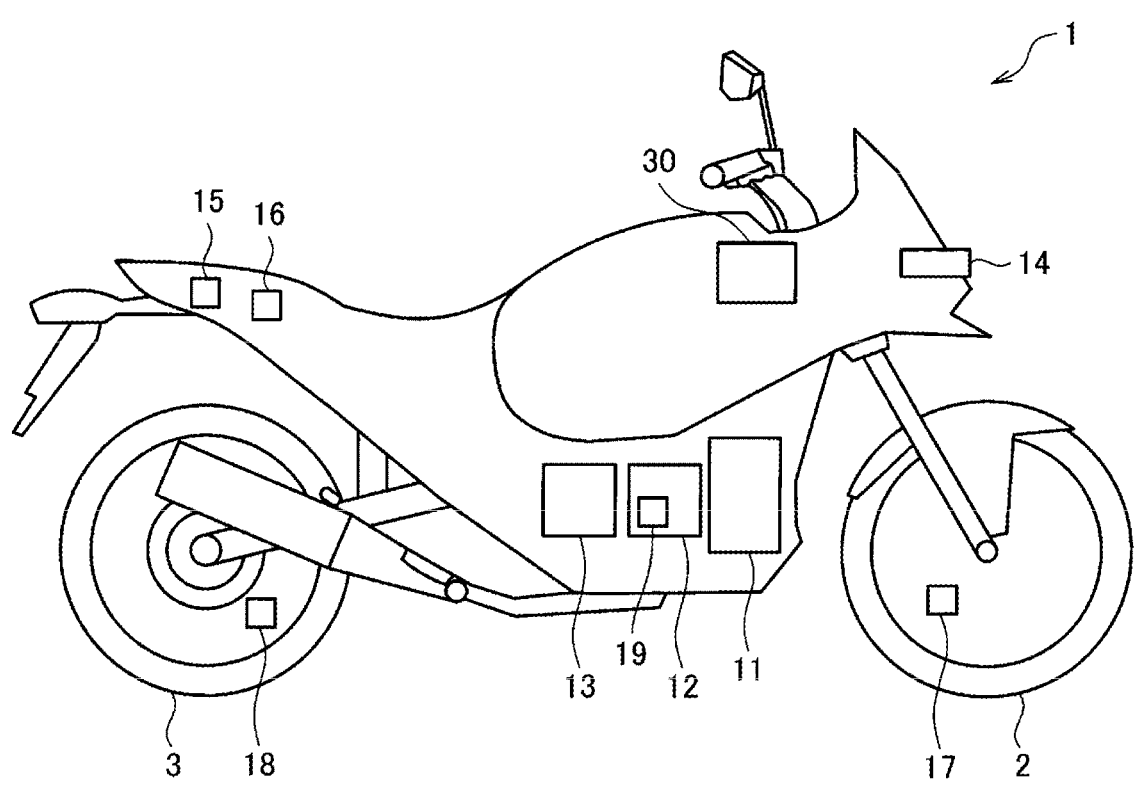

[FIG. 2]
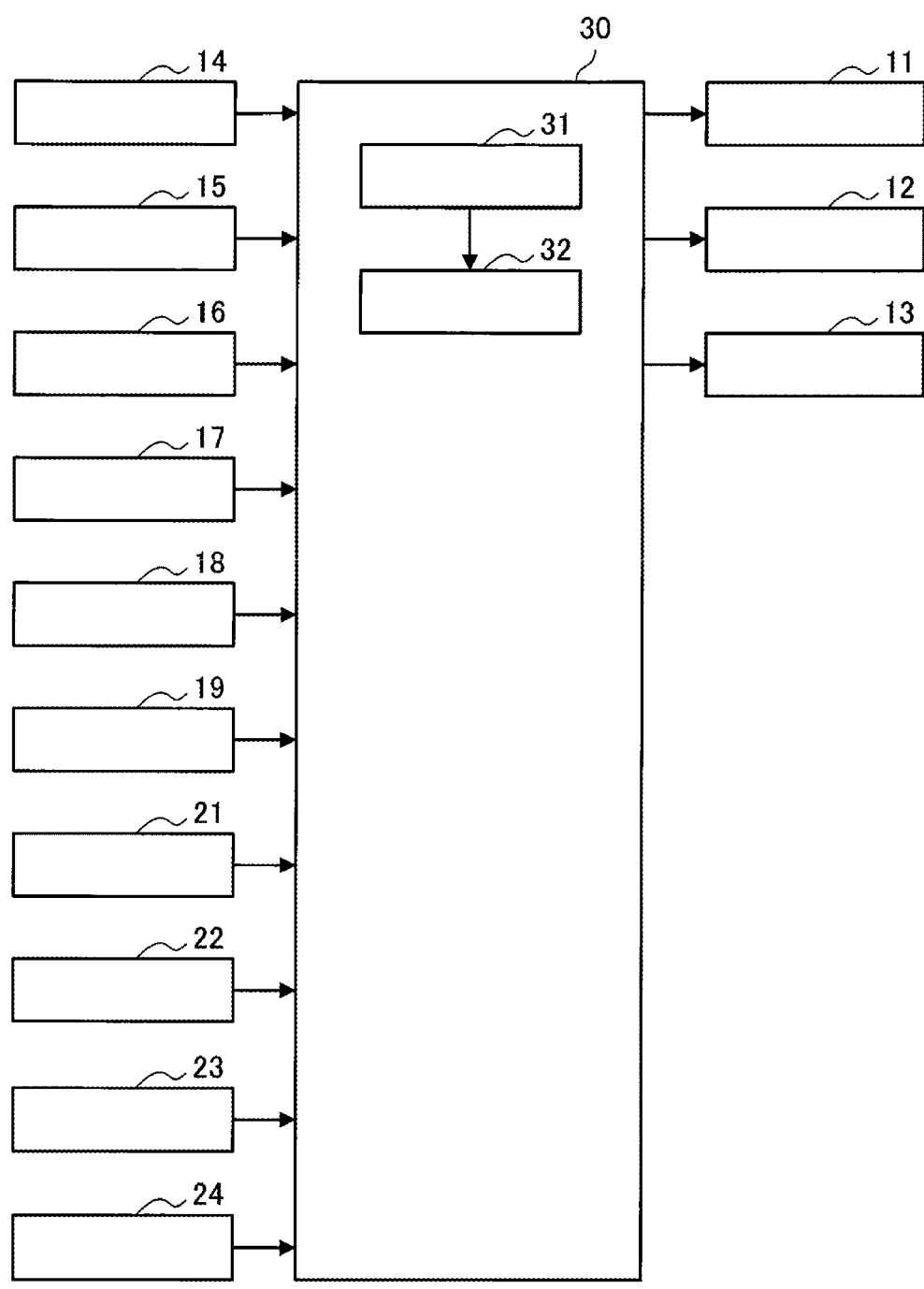

[FIG. 3]
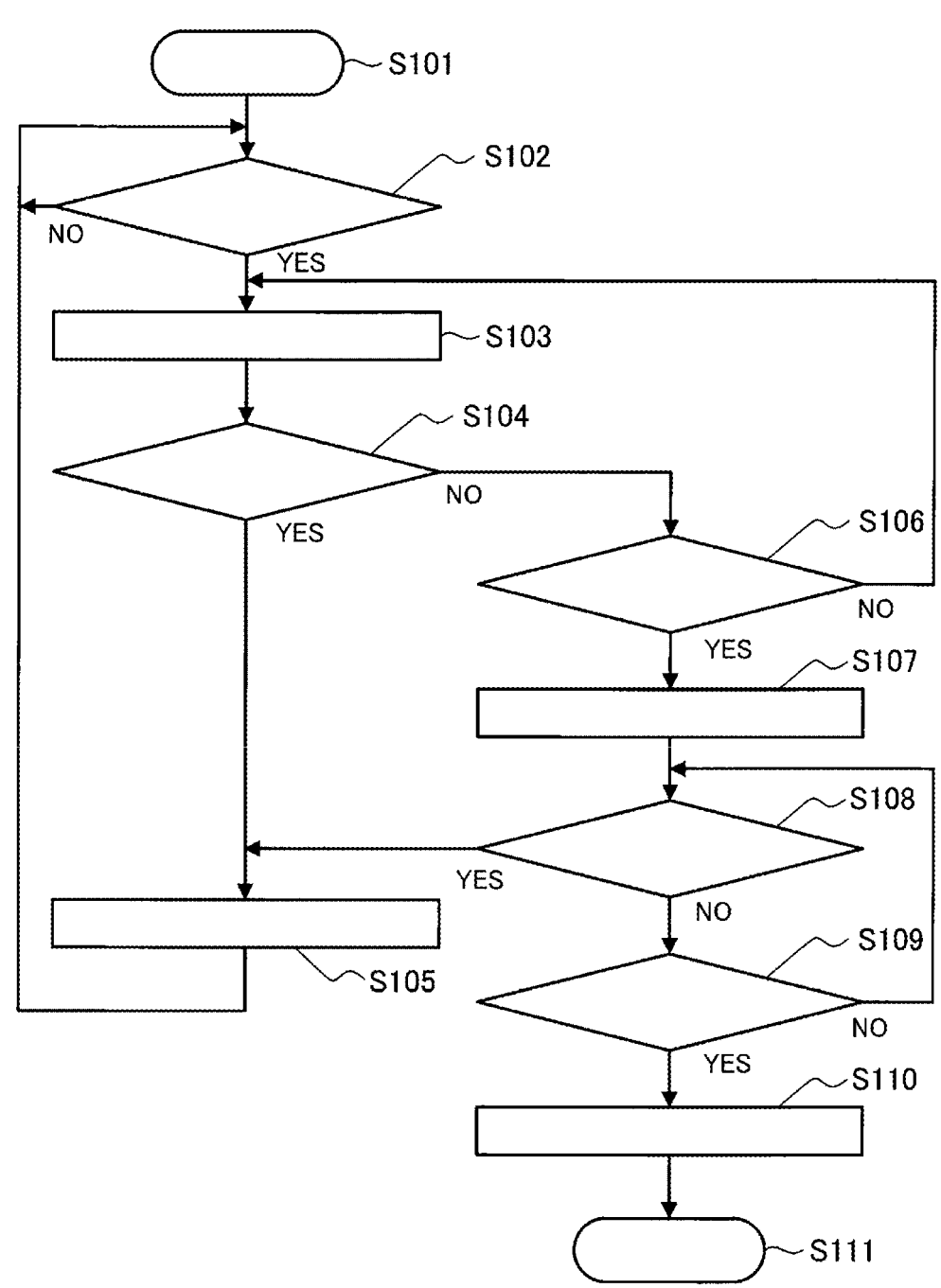

CONTROLLER AND CONTROL METHOD

BACKGROUND

The present disclosure relates to a controller and a control method capable of improving safety of a lean vehicle.

As a conventional technique related to a lean vehicle such as a motorcycle, a technique of assisting with a rider's driving has been available. For example, a driver assistance system is disclosed in JP2009116882A. The driver assistance system warns the rider of the motorcycle that the motorcycle inappropriately approaches an obstacle based on information detected by a sensor that detects the obstacle present in a travel direction or substantially in the travel direction.

By the way, as the technique of assisting with driving, a cruise control to automatically control a vehicle speed has been available. In particular, as the cruise control, there is control that is executed based on a positional relationship information between an own vehicle and a preceding vehicle so as to secure an inter-vehicular distance between the own vehicle and the preceding vehicle as a safe distance. Here, it is considered to apply such a cruise control to the lean vehicle. However, a posture of the lean vehicle is more likely to become unstable than a posture of an automobile having four wheels. For example, the lean vehicle cannot stand upright alone in a stopped state, and is likely to fall over when a speed of the lean vehicle is excessively reduced. For this reason, when the cruise control is applied to the lean vehicle, the speed of the lean vehicle has to be controlled appropriately. Otherwise, the posture of the lean vehicle possibly becomes unstable, which compromises safety.

SUMMARY

The present disclosure has been made with the above-described issues as the background and therefore obtains a controller and a control method capable of improving safety of a lean vehicle.

As one aspect of the present disclosure, a controller maneuvers a lean vehicle and includes an execution section that executes a first operation as an operation that causes the lean vehicle to execute a cruise control based on a positional relationship information between the lean vehicle and a preceding vehicle preceding the lean vehicle. When a speed information, which is information about a speed of the lean vehicle and is acquired during the first operation, indicates that the lean vehicle is decelerated to a reference speed, the execution section executes, instead of the first operation, a second operation as an operation that causes the lean vehicle to execute the cruise control regardless of the positional relationship information.

As one aspect of the present disclosure, a control method for maneuvering a lean vehicle includes executing, using an execution section of a controller, a first operation as an operation that causes the lean vehicle to execute a cruise control based on a positional relationship information between the lean vehicle and a preceding vehicle preceding the lean vehicle. When a speed information, which is information about a speed of the lean vehicle and acquired during the first operation, indicates that the lean vehicle is decelerated to a reference speed, the execution section executes, instead of the first operation, a second operation as an operation that causes the lean vehicle to execute the cruise control regardless of the positional relationship information.

According to the controller and the control method according to the present disclosure, the execution section of the controller executes the first operation as the operation to cause the lean vehicle to execute the cruise control based on the positional relationship information between the lean vehicle and the preceding vehicle preceding the lean vehicle. When the speed information indicates that the lean vehicle is decelerated to the reference speed, the execution section executes, instead of the first operation, the second operation as the operation that causes the lean vehicle to execute the cruise control regardless of the positional relationship information. In this way, it is possible with the second operation to prevent the speed of the lean vehicle from being reduced excessively by the cruise control and thus to prevent the lean vehicle from falling over. Therefore, it is possible to improve safety of the lean vehicle.

BRIEF DESCRIPTION OF DRAWINGS

FIG. 1 is a schematic view illustrating an outline configuration of a lean vehicle according to an embodiment of the present disclosure.

FIG. 2 is a block diagram illustrating an exemplary functional configuration of a controller according to the embodiment of the present disclosure.

FIG. 3 is a flowchart illustrating an example of a processing procedure that is executed by the controller according to the embodiment of the present disclosure.

DETAILED DESCRIPTION

A description will hereinafter be made on a controller according to the present disclosure with reference to the drawings.

The following description will be made on the controller that is used for a two-wheeled motorcycle (see a lean vehicle 1 in FIG. 1). However, a vehicle as a control target of the controller according to the present disclosure only needs to be a lean vehicle, and may be a lean vehicle other than the two-wheeled motorcycle. The lean vehicle means a vehicle, a body of which is tilted to the right when turning in a right direction and is tilted to the left when turning in a left direction. Examples of the lean vehicle are motorcycles (the two-wheeled motor vehicle and a three-wheeled motor vehicle) and pedal-driven vehicles. The motorcycles include a vehicle having an engine as a power source, a vehicle having an electric motor as a power source, and the like. Examples of the motorcycles are a motorbike, a scooter, and an electric scooter. The pedal-driven vehicle means a vehicle capable of traveling forward on a road by a depression force applied to pedals by the rider. Examples of the pedal-driven vehicle are an electrically-assisted pedal-driven vehicle and an electric pedal-driven vehicle.

In addition, a description will hereinafter be made on a case where the engine (more specifically, an engine 11 in FIG. 1, which will be described below) is mounted as a drive source that can output power for driving a wheel. However, as the drive source, a drive source other than the engine (for example, an electric motor) may be mounted, or plural drive sources may be mounted.

A configuration, operation, and the like, which will be described below, merely constitute one example. The controller and the control method according to the present disclosure are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Lean Vehicle>

A description will be made on a configuration of the lean vehicle 1 according to an embodiment of the present disclosure with reference to FIG. 1 and FIG. 2.

FIG. 1 is a schematic view illustrating an outline configuration of the lean vehicle 1. FIG. 2 is a block diagram illustrating an exemplary functional configuration of a controller 30.

The lean vehicle 1 is a two-wheeled motorcycle that corresponds to an example of the lean vehicle according to the present disclosure. As illustrated in FIG. 1 and FIG. 2, the lean vehicle 1 includes a front wheel 2, a rear wheel 3, the engine 11, a transmission 12, a hydraulic pressure control unit 13, a surrounding environment sensor 14, an inertial measurement unit (IMU) 15, a seating sensor 16, a front-wheel rotational frequency sensor 17, a rear-wheel rotational frequency sensor 18, a gear position sensor 19, an accelerator operation section 21, a brake operation section 22, a clutch operation section 23, a transmission operation section 24, and the controller (ECU) 30.

The engine 11 corresponds to an example of a drive source of the lean vehicle 1 and can output power for driving the wheel. For example, the engine 11 is provided with: one or plural cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 11, and an intake air amount to the combustion chamber varies according to a throttle opening amount as an opening amount of the throttle valve.

The transmission 12 is a stepped transmission. That is, the transmission 12 has plural gear stages. An input shaft of the transmission 12 is connected to the crankshaft of the engine 11. An output shaft of the transmission 12 is connected to the rear wheel 3. Accordingly, the power that is output from the engine 11 is transmitted to the transmission 12, is changed by the transmission 12, and is then transmitted to the rear wheel 3 as a drive wheel. The rider can make a shift change by performing a gear shift operation while a clutch that is interposed between the crankshaft of the engine 11 and the input shaft of the transmission 12 is disengaged by a clutch operation.

The hydraulic pressure control unit 13 is a unit that has a function of controlling a braking force to be generated on the wheel. For example, the hydraulic pressure control unit 13 includes components (for example, a control valve and a pump) that are provided to an oil channel connecting a master cylinder and a wheel cylinder and control a brake hydraulic pressure in the wheel cylinder. The braking force to be generated on the wheel is controlled by controlling operation of the components in the hydraulic pressure control unit 13. Here, the hydraulic pressure control unit 13 may control the braking force to be generated on each of the front wheel 2 and the rear wheel 3 or may only control the braking force to be generated on one of the front wheel 2 and the rear wheel 3.

The surrounding environment sensor 14 detects surrounding environment information related to environment around the lean vehicle 1. For example, the surrounding environment sensor 14 is provided to a front portion of a trunk of the lean vehicle 1, and detects the surrounding environment information in front of the lean vehicle 1. The surrounding environment information detected by the surrounding environment sensor 14 is output to the controller 30.

The surrounding environment information that is detected by the surrounding environment sensor 14 may be information on a distance to or an orientation of a target object that is located around the lean vehicle 1 (for example, a relative position, a relative distance, a relative speed, relative acceleration, or the like), or may be a characteristic of the target object that is located around the lean vehicle 1 (for example, a type of the target object, a shape of the target object itself, a mark on the target object, or the like). Examples of the surrounding environment sensor 14 are a radar, a Lidar sensor, an ultrasonic sensor, and a camera.

The surrounding environment information can also be detected by a surrounding environment sensor that is mounted to another vehicle or by an infrastructure facility. That is, the controller 30 can also acquire the surrounding environment information via wireless communication with the other vehicle or the infrastructure facility.

The IMU 15 includes a three-axis gyroscope sensor and a three-directional acceleration sensor, and detects a posture of the lean vehicle 1. The IMU 15 is provided to the trunk of the lean vehicle 1, for example. For example, the IMU 15 detects a lean angle of the lean vehicle 1 and outputs a detection result. The IMU 15 may detect another physical quantity that can substantially be converted to the lean angle of the lean vehicle 1. The lean angle corresponds to an angle representing a tilt in a rolling direction of a body (more specifically, the trunk) of the lean vehicle 1 with respect to an upper vertical direction. The IMU 15 may only include parts of the three-axis gyroscope sensor and the three-directional acceleration sensor.

The seating sensor 16 is provided to a rear seat of the lean vehicle 1 and detects presence or absence of a passenger or a loaded article on the rear seat. The presence or the absence of the occupant on the rear seat corresponds to an example of occupant information of the lean vehicle 1. Here, the occupant information only needs to be information on the occupant of the lean vehicle 1 and can include the number of the occupant in the lean vehicle 1, weight of each of the occupants, and the like, for example. The presence or the absence of the loaded article on the rear seat corresponds to an example of loaded article information of the lean vehicle 1. Here, the loaded article information only needs to be information on the loaded article of the lean vehicle 1 and can include the number of the loaded article in the lean vehicle 1, weight of each of the loaded articles, and the like, for example. That is, the seating sensor 16 corresponds to an example of a sensor that detects the occupant information and the loaded article information of the lean vehicle 1. However, the occupant information or the loaded article information of the lean vehicle 1 may be detected by a sensor (for example, a camera or the like) other than the seating sensor 16.

The front-wheel rotational frequency sensor 17 is a wheel rotational frequency sensor that detects a rotational frequency of the front wheel 2 (for example, a rotational frequency of the front wheel 2 per unit time [rpm], a travel distance of the front wheel 2 per unit time [km/h], or the like), and outputs a detection result. The front-wheel rotational frequency sensor 17 may detect another physical quantity that can substantially be converted to the rotational frequency of the front wheel 2. The front-wheel rotational frequency sensor 17 is provided to the front wheel 2.

The rear-wheel rotational frequency sensor 18 is a wheel rotational frequency sensor that detects a rotational frequency of the rear wheel 3 (for example, the rotational frequency of the rear wheel 3 per unit time [rpm], a travel distance of the rear wheel 3 per unit time [km/h], or the like), and outputs a detection result. The rear-wheel rotational frequency sensor 18 may detect another physical quantity that can substantially be converted to the rotational frequency of the rear wheel 3. The rear-wheel rotational frequency sensor 18 is provided to the rear wheel 3.

The gear position sensor 19 detects at which gear stage the gear stage of the transmission 12 is set, and outputs a detection result. The gear position sensor 19 is provided to the transmission 12, for example.

The accelerator operation section 21 is an operation section that is used by the rider for an accelerator operation. The accelerator operation is an operation to adjust drive power of the lean vehicle 1. For example, the accelerator operation section 21 is an accelerator grip that is provided to a handlebar of the lean vehicle 1, and the accelerator operation is to rotate the accelerator grip.

The brake operation section 22 is an operation section that is used by the rider for a brake operation. The brake operation is an operation to adjust the braking force of the lean vehicle 1. For example, the brake operation section 22 is a brake lever that is provided to the handlebar of the lean vehicle 1, or a brake pedal that is provided to the trunk thereof. The brake operation is an operation to grip the brake lever or an operation to step on the brake pedal.

The clutch operation section 23 is an operation section that is used by the rider for a clutch operation. The clutch operation is an operation to engage or disengage the clutch that is interposed between the crankshaft of the engine 11 and the input shaft of the transmission 12. For example, the clutch operation section 23 is a clutch lever that is provided to the handlebar of the lean vehicle 1, and the clutch operation is an operation to grip the clutch lever.

The transmission operation section 24 is an operation section that is used by the rider for the gear shift operation. For example, the gear shift operation is an operation to switch the gear stage of the transmission 12. For example, the transmission operation section 24 is a shift lever that is provided to the handlebar of the lean vehicle 1, and the gear shift operation is an operation using the shift lever.

The controller 30 maneuvers the lean vehicle 1. For example, the controller 30 is partially or entirely constructed of a microcomputer, a microprocessor unit, or the like. In addition, the controller 30 may partially or entirely be constructed of one whose firmware and the like can be updated, or may partially or entirely be a program module or the like that is executed by a command from a CPU or the like, for example. The controller 30 may be provided as one unit or may be divided into plural units, for example.

As illustrated in FIG. 2, the controller 30 includes an acquisition section 31 and an execution section 32, for example. In addition, the controller 30 communicates with each of the devices of the lean vehicle 1.

The acquisition section 31 acquires information from each of the devices of the lean vehicle 1, and outputs the acquired information to the execution section 32. For example, the acquisition section 31 acquires the information from the surrounding environment sensor 14, the IMU 15, the seating sensor 16, the front-wheel rotational frequency sensor 17, the rear-wheel rotational frequency sensor 18, the gear position sensor 19, the accelerator operation section 21, the brake operation section 22, the clutch operation section 23, and the transmission operation section 24. In the present specification, the acquisition of the information can include extraction, generation, and the like of the information.

The execution section 32 executes various types of control by controlling operation of each of the devices of the lean vehicle 1. For example, the execution section 32 controls the operation of the engine 11, the transmission 12, and the hydraulic pressure control unit 13.

Here, the lean vehicle 1 can select, as a travel mode, a cruise control mode in which the lean vehicle 1 executes a cruise control. For example, in response to the rider's input operation using an input device of the lean vehicle 1, the execution section 32 sets the travel mode to the cruise control mode. In the cruise control mode, the execution section 32 automatically controls a speed of the lean vehicle 1 without relying on an accelerating/decelerating operation (that is, the accelerator operation and the brake operation) by the rider. For example, the execution section 32 monitors a value of the speed of the lean vehicle 1 that is acquired based on the rotational frequency of the front wheel 2 and the rotational frequency of the rear wheel 3, and can thereby control the speed of the lean vehicle 1 to a target speed.

In addition, in the cruise control mode, the execution section 32 executes, as normal operation, operation to cause the lean vehicle 1 to execute the cruise control based on a positional relationship information. The positional relationship information is information about a relationship between the lean vehicle 1 and a preceding vehicle preceding the lean vehicle 1 in regard to a position of the lean vehicle 1 and a position of the preceding vehicle. In the normal operation, for example, the execution section 32 determines the target speed based on the positional relationship information, and controls the speed of the lean vehicle 1 to the target speed. The target speed that is determined based on the positional relationship information is such a speed at which an inter-vehicular distance between the lean vehicle 1 and the preceding vehicle is secured to be equal to or longer than a reference distance. The reference distance is such a distance with which safety against a collision with the preceding vehicle is sufficiently secured. Such normal operation optimizes the inter-vehicular distance between the lean vehicle 1 and the preceding vehicle.

For example, the positional relationship information can include information on a relative position, a relative distance, a relative speed, a relative acceleration, or a relative jerk of the lean vehicle 1 to the preceding vehicle, and can also include a passing time difference between the lean vehicle 1 and the preceding vehicle, or the like. The positional relationship information may be information on another physical quantity that can substantially be converted to one of these types of the information. For example, the positional relationship information can be acquired based on the detection result by the surrounding environment sensor 14.

<Operation of Controller>

A description will be made on operation of the controller 30 according to the embodiment of the present disclosure with reference to FIG. 3.

As described above, in the cruise control mode, the execution section 32 of the controller 30 executes, as the normal operation, the operation to cause the lean vehicle 1 to execute the cruise control based on the positional relationship information between the lean vehicle 1 and the preceding vehicle preceding the lean vehicle 1. Here, when a speed information, which is information about a speed of the lean vehicle 1 and is acquired during execution of the normal operation, indicates that the lean vehicle 1 is decelerated to a reference speed, the execution section 32 executes speed maintenance operation instead of the normal operation. In this way, as will be described below, safety of the lean vehicle 1 can be improved. A description will hereinafter be made on a processing example illustrated in FIG. 3 as an example of processing by the controller 30.

The normal operation corresponds to an example of a first operation. The first operation is an operation that causes the lean vehicle 1 to execute the cruise control based on the positional relationship information with the preceding vehicle preceding the lean vehicle 1. The speed maintenance operation may be an example of a second operation. The second operation is an operation that causes the lean vehicle 1 to execute the cruise control not based on (i.e., regardless of) the positional relationship information between the lean vehicle 1 and the preceding vehicle. However, as will be described below, the second operation is not limited to the speed maintenance operation. Here, automatic stop operation, which will be described below, corresponds to an example of third operation that is operation to automatically stop the lean vehicle 1 not based on the positional relationship information with the preceding vehicle preceding the lean vehicle 1.

FIG. 3 is a flowchart illustrating an example of a processing procedure that is executed by the controller 30. For example, a control flow illustrated in FIG. 3 is executed when the travel mode is set to the cruise control mode. Step S101 in FIG. 3 corresponds to initiation of the control flow illustrated in FIG. 3. Step S111 in FIG. 3 corresponds to termination of the control flow illustrated in FIG. 3. When the control flow illustrated in FIG. 3 is initiated, the normal operation is being executed.

When the control flow illustrated in FIG. 3 is initiated, in step S102, the execution section 32 determines whether the speed information of the lean vehicle 1 indicates that the lean vehicle 1 is decelerated to the reference speed.

The speed information may be information about a current speed of the lean vehicle 1 or a future speed of the lean vehicle 1. For example, the above current speed can be acquired based on the rotational frequency of the front wheel 2 and the rotational frequency of the rear wheel 3. For example, the above future speed can be acquired based on history of the rotational frequency of the front wheel 2 and the rotational frequency of the rear wheel 3. However, the above current speed and the above future speed may be acquired based on a travel state information of the preceding vehicle. The travel state information of the preceding vehicle is information about a travel state of the preceding vehicle and can include information on a speed, acceleration, or jerk, or the like of the preceding vehicle, for example. For example, the travel state information of the preceding vehicle can be acquired based on the detection result by the surrounding environment sensor 14.

For example, when the lean vehicle 1 is decelerated and the current speed thereof reaches the reference speed, the execution section 32 may determine that the speed information of the lean vehicle 1 indicates that the lean vehicle 1 is decelerated to the reference speed. Alternatively, for example, when the future speed of the lean vehicle 1 is near the reference speed and it is expected that the speed of the lean vehicle 1 is decelerated to the reference speed in the future, the execution section 32 may determine the speed information of the lean vehicle 1 to indicate that the lean vehicle 1 is decelerated to the reference speed.

As will be described below, when the speed information of the lean vehicle 1 indicates that the lean vehicle 1 is decelerated to the reference speed, the speed maintenance operation is executed. Thus, the speed of the lean vehicle 1 is maintained at the reference speed after reaching the reference speed. For example, the reference speed can be set to a lower limit value of a speed range within which the lean vehicle 1 can travel in an upright state without falling over, or can be set to a higher value than the lower limit value. Alternatively, for example, the reference speed can be set to a lower limit value of a speed range within which engine stalling does not occur to the lean vehicle 1, or can be set to a higher value than the lower limit value.

In step S102, if the speed information of the lean vehicle 1 is determined not to indicate that the lean vehicle 1 is decelerated to the reference speed (step S102/NO), step S102 is repeated. On the other hand, in step S102, if the speed information of the lean vehicle 1 is determined to indicate that the lean vehicle 1 is decelerated to the reference speed (step S102/YES), the processing proceeds to step S103. Then, in step S103, the execution section 32 executes the speed maintenance operation.

The speed maintenance operation is the operation to cause the lean vehicle 1 to execute the cruise control not based on the positional relationship information between the lean vehicle 1 and the preceding vehicle. More specifically, in the speed maintenance operation, the execution section 32 maintains the speed of the lean vehicle 1. For example, after the speed of the lean vehicle 1 reaches the reference speed, the execution section 32 maintains the speed of the lean vehicle 1 by the speed maintenance operation.

As described above, when the speed information of the lean vehicle 1 during execution of the normal operation indicates that the lean vehicle 1 is decelerated to the reference speed, the execution section 32 executes the speed maintenance operation instead of the normal operation.

As will be described below, in the cruise control mode, it is possible to switch the state of executing the operation (for example, the speed maintenance operation or the automatic stop operation) other than the normal operation to the state of executing the normal operation. That is, in the cruise control mode, the normal operation is enabled by the rider. Thus, more specifically, when the speed information of the lean vehicle 1, which is acquired during execution of the normal operation, indicates that the lean vehicle 1 is decelerated to the reference speed while the normal operation is enabled by the rider, the execution section 32 executes the speed maintenance operation instead of the normal operation.

Here, the reference speed may be a value that is set in advance. However, the reference speed may be a value that is changed based on various parameters. That is, the execution section 32 may change the reference speed based on the various parameters.

For example, the execution section 32 may change the reference speed based on a gear stage information of the transmission 12. The gear stage information is information about the gear stage of the transmission 12 and includes information on which gear stage the gear stage of the transmission 12 is set, for example. For example, the gear stage information can be acquired from the gear position sensor 19.

The lower limit value of the speed range within which engine stalling does not occur varies by the gear stage of the transmission 12. For this reason, the reference speed is changed based on the gear stage information of the transmission 12. In this way, the reference speed can appropriately be set to the lower limit value of the speed range within which engine stalling does not occur to the lean vehicle 1, or can appropriately be set to the higher value than the lower limit value. Therefore, it is possible to prevent the occurrence of engine stalling in the speed maintenance operation.

In addition, for example, the execution section 32 may change the reference speed based on travel posture information of the lean vehicle 1. The travel posture information is information on a travel posture of the lean vehicle 1 and, for example, includes lean angle information that is information on a lean angle of the lean vehicle 1, a yaw rate information that is information on a yaw rate of the lean vehicle 1, lateral acceleration information that is information on lateral acceleration of the lean vehicle 1, or the like. For example, the travel posture information can be acquired from the IMU 15.

A stability degree of the posture of the lean vehicle 1 varies by the travel posture of the lean vehicle 1. For this reason, the reference speed is changed based on the travel posture information of the lean vehicle 1. In this way, the reference speed can appropriately be set to the lower limit value of the speed range within which the lean vehicle 1 can travel in the upright state without falling over, or can appropriately be set to the higher value than the lower limit value. Therefore, it is possible to prevent the posture of the lean vehicle 1 from becoming unstable in the speed maintenance operation. In particular, likeliness of the lean vehicle 1 to fall over in the rolling direction varies by the lean angle and a lean angular velocity of the lean vehicle 1. Thus, it is possible to appropriately prevent the lean vehicle 1 from falling over in the rolling direction by changing the reference speed based on the lean angle information of the lean vehicle 1.

For example, the execution section 32 may change the reference speed based on road surface information. The road surface information is information on a road surface on which the lean vehicle 1 travels, and includes gradient information of the road surface that is information on a degree of a gradient of the road surface, property information of the road surface that is information on a property of the road surface, or the like, for example. For example, the road surface information can be acquired from the surrounding environment sensor 14. For example, when the camera is used as the surrounding environment sensor 14, an image that is captured by the camera is subjected to image processing. In this way, the road surface information can be acquired.

The stability degree of the posture of the lean vehicle 1 varies by the road surface information. For this reason, the reference speed is changed based on the road surface information. In this way, the reference speed can appropriately be set to the lower limit value of the speed range within which the lean vehicle 1 can travel in the upright state without falling over, or can appropriately be set to the higher value than the lower limit value. Therefore, it is possible to prevent the posture of the lean vehicle 1 from becoming unstable in the speed maintenance operation. In particular, the stability degree of the posture of the lean vehicle 1 varies by whether the road surface on which the lean vehicle 1 travels is an uphill road or a downhill road. Thus, it is possible to appropriately prevent the posture of the lean vehicle 1 from becoming unstable by changing the reference speed based on the gradient information of the road surface.

For example, the execution section 32 may change the reference speed based on at least one of the occupant information and the loaded article information of the lean vehicle 1. For example, the occupant information and the loaded article information can be acquired from the seating sensor 16.

The stability degree of the posture of the lean vehicle 1 varies by the occupant information and the loaded article information of the lean vehicle 1. For this reason, the reference speed is changed based on at least one of the occupant information and the loaded article information of the lean vehicle 1. In this way, the reference speed can appropriately be set to the lower limit value of the speed range within which the lean vehicle 1 can travel in the upright state without falling over, or can appropriately be set to the higher value than the lower limit value. Therefore, it is possible to prevent the posture of the lean vehicle 1 from becoming unstable in the speed maintenance operation.

The parameters that are used to change the reference speed are not limited to the above examples. That is, the execution section 32 may change the reference speed based on a parameter other than the above-exemplified parameters. In addition, the execution section 32 may change the reference speed based on plural types of the parameters. The execution section 32 may extract plural candidates for the reference speed based on the plural types of the parameters, and may then determine one of the plural candidates as the reference speed. In this case, preferably, the execution section 32 preferentially determines the candidate at the high speed as the reference speed.

Following step S103, in step S104, the execution section 32 determines whether a switching condition between the normal operation and the speed maintenance operation is satisfied. If it is determined that the switching condition is satisfied (step S104/YES), the processing proceeds to step S105. In step S105, the execution section 32 executes the normal operation instead of the speed maintenance operation, and the processing returns to step S102.

For example, the switching condition may be a condition that the travel state information of the preceding vehicle is information indicating that the preceding vehicle is in an accelerated state. That is, when the travel state information of the preceding vehicle that is acquired during execution of the speed maintenance operation is the information indicating that the preceding vehicle is in the accelerated state, the execution section 32 may execute the normal operation instead of the speed maintenance operation. The accelerated state is not limited to a state where an acceleration continues for a specified time period. The accelerated state may include a state where a time average of the acceleration in the specified time period is a positive value even when deceleration partially occurs in the specified time period. The accelerated state may include a state where the acceleration is increased over time when values of the acceleration at two time points are compared.

In addition, for example, the switching condition may be a condition that the operation state information, which is information about an operation of the accelerator operation section 21 by the rider, indicates that the accelerator operation section 21 is operated. That is, when the operation state information acquired during execution of the speed maintenance operation indicates that the accelerator operation section 21 is operated, the execution section 32 may execute the normal operation instead of the speed maintenance operation. The operation state information of the accelerator operation section 21 by the rider is information on an operation state of the accelerator operation section 21 by the rider and can be acquired from the accelerator operation section 21, for example.

When the accelerator operation section 21 is the accelerator grip, the condition that the accelerator operation section 21 is operated is not limited to a condition that an operation to rotate the accelerator grip in a counterclockwise direction is performed from an unloaded state. The counterclockwise direction is, i.e., a direction in which drive power generated to the lean vehicle 1 is increased. The condition that the accelerator operation section 21 is operated can include a condition that an operation to rotate the accelerator grip in a clockwise direction as a reverse direction of the counterclockwise direction is performed from the unloaded state.

Here, the speed maintenance operation may be switched to the normal operation immediately after the above switching condition is satisfied or after certain duration of time elapses from a time point at which the above switching condition is satisfied. For example, when the speed maintenance operation is switched to the normal operation based on the operation state information of the accelerator operation section 21 by the rider, the execution section 32 may switch the speed maintenance operation to the normal operation after the speed of the lean vehicle 1 is increased with the accelerator operation and the speed of the lean vehicle 1 reaches a higher speed than the reference speed to some degree.

When executing the normal operation instead of the speed maintenance operation, the execution section 32 may use a setting information. The setting information is information about a setting that is set by the rider in a last normal operation that has been executed lastly before the speed maintenance operation is started. The setting information can include various types of the information that are used in the cruise control mode. For example, the setting information can include an upper limit value of the speed of the lean vehicle 1 in the cruise control mode, various parameters for determining the target speed of the lean vehicle 1, or the like.

If it is determined in step S104 that the switching condition is not satisfied (step S104/NO), the processing proceeds to step S106. In step S106, the execution section 32 determines whether a specific operation is performed by the rider.

If it is determined in step S106 that the specific operation is not performed by the rider (step S106/NO), the processing returns to step S103. On the other hand, if it is determined in step S106 that the specific operation is performed by the rider (step S106/YES), the processing proceeds to step S107. In step S107, the execution section 32 initiates the automatic stop operation.

The automatic stop operation is the operation to automatically stop the lean vehicle 1 not based on the positional relationship information between the lean vehicle 1 and the preceding vehicle. More specifically, in the automatic stop operation, the execution section 32 decelerates and stops the lean vehicle 1. Here, in the automatic stop operation, the execution section 32 controls the deceleration, which is generated to the lean vehicle 1, not based on the positional relationship information.

As described above, when the specific operation is performed by the rider while the normal operation is enabled by the rider of the lean vehicle 1, the execution section 32 executes the automatic stop operation. The above specific operation can be any of various operations.

For example, the above specific operation can include an operation using the brake operation section 22 that is used for the brake operation by the rider. An example of the specific operation using the brake operation section 22 is an operation of the brake operation section 22 with an operation amount to such extent that the braking force is substantially and hardly generated to the lean vehicle 1.

For example, the above specific operation can include an operation using the accelerator operation section 21 that is used for the accelerator operation by the rider. An example of the specific operation using the accelerator operation section 21 is the operation to rotate the accelerator grip in the clockwise direction as the reverse direction of the counterclockwise direction (that is, the direction in which the drive power generated to the lean vehicle 1 is increased) from the unloaded state.

For example, the above specific operation can include an operation using the clutch operation section 23 that is used for the clutch operation by the rider. An example of the specific operation using the clutch operation section 23 is the operation to disengage the clutch that is interposed between the crankshaft of the engine 11 and the input shaft of the transmission 12.

For example, the above specific operation can include an operation using the transmission operation section 24 that is used for the gear shift operation by the rider. An example of the specific operation using the transmission operation section 24 is a shift down operation to shift down the gear stage of the transmission 12 by one stage.

However, the above specific operation is not limited to the above examples. For example, the above specific operation may be an operation using any of the above operation sections but differing from the above-described examples. In addition, for example, the above specific operation may be an operation using a different operation section from any of the above operation sections. Furthermore, for example, the above specific operation may be an operation using a dedicated operation section for executing the automatic stop operation. Moreover, for example, the above specific operation may be an operation using the plural operation sections.

In the automatic stop operation, for example, the execution section 32 controls the deceleration, which is generated to the lean vehicle 1, to deceleration, which is set in advance. In this case, the rider can easily predict the behavior of the lean vehicle 1 in the automatic stop operation. Thus, the behavior of the lean vehicle 1 is likely to be in line with the rider's intention.

Here, in the automatic stop operation, the execution section 32 may change the deceleration, which is generated to the lean vehicle 1, based on any of the various parameters.

For example, in the automatic stop operation, the execution section 32 may change the deceleration, which is generated to the lean vehicle 1, based on the travel state information of the preceding vehicle. The inter-vehicular distance between the lean vehicle 1 and the preceding vehicle is likely to be reduced according to the travel state of the preceding vehicle. Therefore, in the automatic stop operation, it is possible to prevent the inter-vehicular distance between the lean vehicle 1 and the preceding vehicle from becoming excessively short by changing the deceleration, which is generated to the lean vehicle 1, based on the travel state information of the preceding vehicle. For example, when the speed of the preceding vehicle is excessively low, it is possible to prevent the inter-vehicular distance between the lean vehicle 1 and the preceding vehicle from becoming excessively short by increasing the deceleration that is generated to the lean vehicle 1.

For example, in the automatic stop operation, the execution section 32 may change the deceleration, which is generated to the lean vehicle 1, based on the travel posture information of the lean vehicle 1. The stability degree of the posture of the lean vehicle 1 varies by the travel posture of the lean vehicle 1. Therefore, in the automatic stop operation, it is possible to prevent the posture of the lean vehicle 1 from becoming unstable by changing the deceleration, which is generated to the lean vehicle 1, based on the travel posture information of the lean vehicle 1. In particular, in the automatic stop operation, it is possible to appropriately prevent the lean vehicle 1 from falling over in the rolling direction by changing the deceleration, which is generated to the lean vehicle 1, based on the lean angle information of the lean vehicle 1.

For example, in the automatic stop operation, the execution section 32 may change the deceleration, which is generated to the lean vehicle 1, based on the road surface information. The stability degree of the posture of the lean vehicle 1 varies by the road surface information. Therefore, in the automatic stop operation, it is possible to prevent the posture of the lean vehicle 1 from becoming unstable by changing the deceleration, which is generated to the lean vehicle 1, based on the road surface information. In particular, in the automatic stop operation, it is possible to appropriately prevent the posture of the lean vehicle 1 from becoming unstable by changing the deceleration, which is generated to the lean vehicle 1, based on the gradient information of the road surface.

In the automatic stop operation, the execution section 32 may change a stop position of the lean vehicle 1 based on the road surface information. For example, the execution section 32 appropriately controls the engine 11 and the hydraulic pressure control unit 13 and can thereby adjust the stop position of the lean vehicle 1 in a front-rear direction. For example, based on the road surface information, the execution section 32 evaluates a degree of danger at the time when the rider's feet touch the road surface at each of plural positions in the front-rear direction on the road surface. Then, the execution section 32 adjusts the stop position of the lean vehicle 1 in a manner to reduce the above degree of danger at the stop position of the lean vehicle 1 to be lower than a reference degree. In this way, it is possible to stabilize a stopped posture of the lean vehicle 1 at a stop. Therefore, it is possible to prevent the lean vehicle 1 and the rider from falling over.

For example, in the automatic stop operation, the execution section 32 may change the deceleration, which is generated to the lean vehicle 1, based on the speed of the lean vehicle 1. The stability degree of the posture of the lean vehicle 1 varies by the speed of the lean vehicle 1. Therefore, in the automatic stop operation, it is possible to prevent the posture of the lean vehicle 1 from becoming unstable by changing the deceleration, which is generated to the lean vehicle 1, based on the speed of the lean vehicle 1. For example, when the speed of the lean vehicle 1 is excessively low (for example, near 0 km/h), the deceleration, which is generated to the lean vehicle 1, is reduced. In this way, it is possible to appropriately prevent the posture of the lean vehicle 1 from becoming unstable.

For example, in the automatic stop operation, the execution section 32 may change the deceleration, which is generated to the lean vehicle 1, based on at least one of the occupant information and the loaded article information of the lean vehicle 1. The stability degree of the posture of the lean vehicle 1 varies by the occupant information and the loaded article information of the lean vehicle 1. Therefore, in the automatic stop operation, it is possible to prevent the posture of the lean vehicle 1 from becoming unstable by changing the deceleration, which is generated to the lean vehicle 1, based on at least one of the occupant information and the loaded article information of the lean vehicle 1.

In the automatic stop operation, the parameters that are used to change the deceleration generated to the lean vehicle 1 are not limited to the above examples. That is, in the automatic stop operation, the execution section 32 may change the deceleration, which is generated to the lean vehicle 1, based on a parameter other than the above-exemplified parameters. In addition, in the automatic stop operation, the execution section 32 may change the deceleration, which is generated to the lean vehicle 1, based on the plural types of the parameters.

Following step S107, in step S108, the execution section 32 determines whether the operation state information, which is information about an operation of the accelerator operation section 21 by the rider, indicates that the accelerator operation section 21 is operated. If the operation state information is determined to indicate that the accelerator operation section 21 is operated (step S108/YES), the processing proceeds to step S105. In step S105, the execution section 32 executes the normal operation instead of the automatic stop operation, and the processing returns to step S102.

As described above, when the operation state information, which is information about an operation of the accelerator operation section 21 by the rider and is acquired during execution of the automatic stop operation, indicates that the accelerator operation section 21 is operated, the execution section 32 executes the normal operation instead of the automatic stop operation. When the accelerator operation section 21 is the accelerator grip, the condition that the accelerator operation section 21 is operated is not limited to the condition that the operation to rotate the accelerator grip in the counterclockwise direction is performed from the unloaded state. The condition that the accelerator operation section 21 is operated can also include the condition that the operation to rotate the accelerator grip in the clockwise direction as the reverse direction of the counterclockwise direction is performed from the unloaded state. The counterclockwise direction is, i.e., the direction in which the drive power generated to the lean vehicle 1 is increased.

Here, the automatic stop operation may be switched to the normal operation immediately after it is determined YES in step S108 or after certain duration of time elapses from a time point at which it is determined YES in step S108. For example, the execution section 32 may switch the automatic stop operation to the normal operation after the speed of the lean vehicle 1 is increased with the accelerator operation and the speed of the lean vehicle 1 reaches the reference speed or the higher speed than the reference speed to some degree.

When executing the normal operation instead of the automatic stop operation, the execution section 32 may use the setting information. The setting information is the information about the setting that is set by the rider in the last normal operation that has been executed lastly before the automatic stop operation is started. As described above, the setting information can include the various types of the information that are used in the cruise control mode.

In step S108, if the operation state information, which is information about an operation of the accelerator operation section 21 by the rider, is determined not to indicate that the accelerator operation section 21 is operated (step S108/NO), the processing proceeds to step S109. In step S109, the execution section 32 determines whether the lean vehicle 1 is stopped.

If it is determined in step S109 that the lean vehicle 1 is not stopped (step S109/NO), the processing returns to step S108. On the other hand, if it is determined in step S109 that the lean vehicle 1 is stopped (step S109/YES), the processing proceeds to step S110. In step S110, the execution section 32 terminates the automatic stop operation. Then, the control flow illustrated in FIG. 3 is terminated.

After the lean vehicle 1 is stopped by the automatic stop operation, the lean vehicle 1 is supported while the rider's feet touch the road surface. When the rider performs the accelerator operation, the execution section 32 restarts and reaccelerates the lean vehicle 1 in response to the accelerator operation. In other words, when the operation state information of the accelerator operation section 21 indicates that the accelerator operation section 21 is operated, the execution section 32 restarts and reaccelerates the lean vehicle 1 in response to the accelerator operation. When the speed of the lean vehicle 1 reaches the reference speed or the higher speed than the reference speed to some degree, the execution section 32 executes the normal operation. In this way, the lean vehicle 1 can be stopped and restarted in the cruise control mode without performing an operation to cancel the cruise control mode. When an operation using the operation section other than the accelerator operation section 21 is performed after the lean vehicle 1 is stopped by the automatic stop operation, the execution section 32 may restart the lean vehicle 1.

The description has been made so far on the processing example by the controller 30 with reference to the flowchart in FIG. 3. However, the processing executed by the controller 30 is not limited to the above example. For example, as will be described below, a change may be made to a part of the processing that has been described above, or additional processing may be executed for the processing that has been described above.

The above description has been made on the example in which the automatic stop operation is executed when the rider performs the specific operation during execution of the speed maintenance operation. However, the execution section 32 may execute the automatic stop operation when the rider performs the specific operation during execution of the normal operation.

When collision possibility information of the lean vehicle 1 that is acquired during execution of the speed maintenance operation is information indicating that a collision possibility of the lean vehicle 1 exceeds a reference degree, the execution section 32 may execute operation to apply automatic emergency braking to the lean vehicle 1 instead of the speed maintenance operation. The collision possibility information is information on the collision possibility of the lean vehicle 1 and can be acquired from the surrounding environment sensor 14, for example. The automatic emergency braking is control to generate, to the lean vehicle 1, the deceleration at which the lean vehicle 1 can avoid the collision with an obstacle such as the preceding vehicle.

The execution section 32 may execute operation to continue application of the braking force to the lean vehicle 1 after the lean vehicle 1 is stopped by the automatic stop operation. In such operation, the execution section 32 applies the braking force to the lean vehicle 1 without relying on the brake operation by the rider. In this way, the lean vehicle 1 remains at the stop position and is thereby prevented from moving in the front-rear direction.

The above description has been made on the example in which the speed maintenance operation is executed as the example of the second operation. However, the second operation is not limited to the speed maintenance operation. The second operation only needs to be operation to cause the lean vehicle 1 to execute the cruise control not based on the positional relationship information between the lean vehicle 1 and the preceding vehicle. For example, the second operation may be operation to control the speed of the lean vehicle 1 to fall within the specified speed range including the reference speed.

<Effects of Controller>

A description will be made on effects of the controller 30 according to the embodiment of the present disclosure.

According to the controller 30 of the present disclosure, when the speed information of the lean vehicle 1, which is acquired during execution of the first operation, indicates that the lean vehicle 1 is decelerated to the reference speed, the execution section 32 executes, instead of the first operation, the second operation so that the lean vehicle 1 is caused to execute the cruise control regardless of the positional relationship information. For example, the first operation may be the normal operation and causes the lean vehicle 1 to execute the cruise control based on the positional relationship information between the lean vehicle 1 and the preceding vehicle. For example, the second operation may be the speed maintenance operation. More specifically, when the speed information of the lean vehicle 1 acquired during execution of the first operation indicates that the lean vehicle 1 is decelerated to the reference speed while the first operation is enabled by the rider, the execution section 32 executes the second operation instead of the first operation.

In this way, it is possible to prevent the speed of the lean vehicle 1 from being reduced excessively by the cruise control. For example, when the cruise control is executed based on the positional relationship information while the lean vehicle 1 is decelerated to the reference speed, there is a possibility that the speed of the lean vehicle 1 becomes much lower than the reference speed and the posture of the lean vehicle 1 becomes unstable. Meanwhile, when the lean vehicle 1 executes the cruise control regardless of the positional relationship information while the lean vehicle 1 is decelerated to the reference speed, it is possible to prevent the speed of the lean vehicle 1 from becoming much lower than the reference speed and thus to prevent the posture of the lean vehicle 1 from becoming unstable. In this way, it is possible to prevent the lean vehicle 1 from falling over. Therefore, it is possible to improve the safety of the lean vehicle 1.

Preferably, when the travel state information of the preceding vehicle that is acquired during execution of the second operation is the information indicating that the preceding vehicle is in the accelerated state, the execution section 32 of the controller 30 executes the first operation instead of the second operation. As a result, when the preceding vehicle is in the accelerated state, the cruise control is executed based on the positional relationship information. Therefore, the inter-vehicular distance between the lean vehicle 1 and the preceding vehicle is appropriately controlled.

Preferably, when the operation state information, which is information about an operation of the accelerator operation section 21 by the rider of the lean vehicle 1 and is acquired during execution of the second operation, indicates that the accelerator operation section 21 is operated, the execution section 32 of the controller 30 executes the first operation instead of the second operation. As a result, the accelerator operation is performed. In addition, when the speed of the lean vehicle 1 becomes higher than the reference speed, the second operation is appropriately switched to the first operation.

Preferably, in the controller 30, when executing the first operation instead of the second operation, the execution section 32 uses the setting information. The setting information is the information about a setting that is set by the rider in the last first operation that has been executed lastly before of the second operation is started. As a result, when the first operation is executed after execution of the second operation, it is possible to prevent the rider from feeling a sense of discomfort, which is caused by a change in the behavior of the lean vehicle 1 from the last first operation that has been executed before execution of the second operation.

Preferably, in the controller 30, the execution section 32 changes the reference speed based on the gear stage information of the transmission 12. In this way, in the second operation, it is possible to prevent the occurrence of engine stalling.

Preferably, in the controller 30, the execution section 32 changes the reference speed based on the travel posture information of the lean vehicle 1. In this way, in the second operation, it is possible to prevent the posture of the lean vehicle 1 from becoming unstable.

Preferably in the controller 30, the travel posture information includes the lean angle information of the lean vehicle 1. As a result, the reference speed can be changed based on the lean angle information of the lean vehicle 1. Therefore, in the second operation, it is possible to further appropriately prevent the posture of the lean vehicle 1 from becoming unstable.

Preferably, in the controller 30, the execution section 32 changes the reference speed based on the road surface information. In this way, in the second operation, it is possible to prevent the posture of the lean vehicle 1 from becoming unstable.

Preferably, in the controller 30, the road surface information includes the gradient information of the road surface. In this way, it is possible to change the reference speed based on the gradient information of the road surface. Therefore, in the second operation, it is possible to further appropriately prevent the posture of the lean vehicle 1 from becoming unstable.

Preferably, in the controller 30, the execution section 32 changes the reference speed based on at least one of the occupant information and the loaded article information of the lean vehicle 1. In this way, in the second operation, it is possible to prevent the posture of the lean vehicle 1 from becoming unstable.

Preferably, when the collision possibility information of the lean vehicle 1 that is acquired during execution of the second operation is the information indicating that the collision possibility of the lean vehicle 1 exceeds the reference degree, in the controller 30, the execution section 32 executes the operation to apply the automatic emergency braking to the lean vehicle 1 instead of the second operation. In this way, when the collision possibility of the lean vehicle 1 exceeds the reference degree during execution of the second operation, it is possible to appropriately prevent the collision between the lean vehicle 1 and the obstacle such as the preceding vehicle.

Preferably, when the specific operation is performed by the rider while the first operation is enabled by the rider of the lean vehicle 1, in the controller 30, the execution section 32 executes the third operation (for example, the automatic stop operation in the above example) as the operation to automatically stop the lean vehicle 1 not based on the positional relationship information. In this way, when it is attempted to stop the lean vehicle 1 during execution of the cruise control, the lean vehicle 1 can be decelerated in line with the rider's intention. Thus, it is possible to prevent the lean vehicle 1 from falling over by the unintended deceleration. Therefore, it is possible to further appropriately improve the safety of the lean vehicle 1.

Preferably, in the controller 30, the specific operation includes the operation using the brake operation section 22 that is used for the brake operation by the rider. In this way, the lean vehicle 1 is further appropriately decelerated in line with the rider's intention by a simple and intuitive operation.

Preferably, in the controller 30, the specific operation includes the operation using the accelerator operation section 21 that is used for the accelerator operation by the rider. In this way, the lean vehicle 1 is further appropriately accelerated in line with the rider's intention by a simple and intuitive operation.

Preferably, in the controller 30, the specific operation includes the operation using the clutch operation section 23 that is used for the clutch operation by the rider. In this way, the lean vehicle 1 is appropriately decelerated in line with the rider's intention by a simple and intuitive operation.

Preferably, in the controller 30, the specific operation includes the operation using the transmission operation section 24 that is used for the gear shift operation by the rider. In this way, the lean vehicle 1 is appropriately decelerated in line with the rider's intention by a simple and intuitive operation.

Preferably, in the controller 30, in the third operation, the execution section 32 changes the deceleration, which is generated to the lean vehicle 1, based on the travel state information of the preceding vehicle. In this way, in the third operation, it is possible to prevent the inter-vehicular distance between the lean vehicle 1 and the preceding vehicle from becoming excessively short.

Preferably, in the controller 30, in the third operation, the execution section 32 changes the deceleration, which is generated to the lean vehicle 1, based on the travel posture information of the lean vehicle 1. In this way, in the third operation, it is possible to prevent the posture of the lean vehicle 1 from becoming unstable.

Preferably, in the controller 30, in the third operation, the execution section 32 changes the deceleration, which is generated to the lean vehicle 1, based on the road surface information. In this way, in the third operation, it is possible to prevent the posture of the lean vehicle 1 from becoming unstable.

Preferably, in the controller 30, in the third operation, the execution section 32 changes the stop position of the lean vehicle 1 based on the road surface information. In this way, in the third operation, it is possible to further appropriately prevent the posture of the lean vehicle 1 from becoming unstable.

Preferably, in the controller 30, in the third operation, the execution section 32 changes the deceleration, which is generated to the lean vehicle 1, based on at least one of the occupant information and the loaded article information of the lean vehicle 1. In this way, in the third operation, it is possible to prevent the posture of the lean vehicle 1 from becoming unstable.

Preferably, in the controller 30, the execution section 32 executes the operation to continue the application of the braking force to the lean vehicle 1 after the lean vehicle 1 is stopped by the third operation. In this way, in the third operation, it is possible to prevent the posture of the lean vehicle 1 from becoming unstable after the lean vehicle 1 is stopped.

Preferably, when the operation state information, which is information about an operation of the accelerator operation section 21 of the lean vehicle 1 by the rider and is acquired during execution of the third operation, indicates that the accelerator operation section 21 is operated, in the controller 30, the execution section 32 executes the first operation instead of the third operation. As a result, the accelerator operation is performed. In addition, when the speed of the lean vehicle 1 becomes higher than the reference speed, the third operation is appropriately switched to the first operation.

Preferably, in the controller 30, when executing the first operation instead of the third operation, the execution section 32 uses the setting information. The setting information is the information about a setting that is set by the rider in the last first operation executed lastly before the third operation is started. As a result, when the first operation is executed after execution of the third operation, it is possible to prevent the rider from feeling the sense of discomfort, which is caused by the change in the behavior of the lean vehicle 1 from the last first operation that has been executed before execution of the third operation.

The present disclosure is not limited to the embodiment that has been described. For example, only a part of the embodiment may be implemented.

REFERENCE SIGNS LIST

1: Lean vehicle
2: Front wheel
3: Rear wheel
11: Engine
12: Transmission
13: Hydraulic pressure control unit
14: Surrounding environment sensor
15: Inertial measurement unit
16: Seating sensor
17: Front-wheel rotational frequency sensor
18: Rear-wheel rotational frequency sensor
19: Gear position sensor
21: Accelerator operation section
22: Brake operation section
23: Clutch operation section
24: Gear shift operation section
30: Controller
31: Acquisition section
32: Execution section

The invention claimed is:

1. A controller (30) configured to maneuver a lean vehicle (1), the controller comprising:

an execution section (32) that executes a first operation as an operation that causes the lean vehicle (1) to execute a cruise control based on a positional relationship information between the lean vehicle (1) and a preceding vehicle preceding the lean vehicle (1), wherein when a speed information, which is information about a speed of the lean vehicle (1) and acquired during the first operation, indicates that the lean vehicle (1) is decelerated to a reference speed, the execution section (32) executes, instead of the first operation, a second operation as an operation that causes the lean vehicle (1) to execute the cruise control regardless of the positional relationship information.

2. The controller according to claim 1, wherein the execution section (32) executes the first operation instead of the second operation when a travel state information of the preceding vehicle acquired during the second operation indicates that the preceding vehicle is in an accelerated state.

3. The controller according to claim 1, wherein the execution section (32) executes the first operation instead of the second operation when an operation state information, which is information about an operation of an accelerator operation section (21) of the lean vehicle (1) by a rider of the lean vehicle (1) and is acquired during execution of the second operation, indicates that the accelerator operation section (21) is operated.

4. The controller according to claim 2, wherein when the first operation is executed instead of the second operation, the execution section (32) uses a setting information, and the setting information is information about a setting that is set by the rider during a last first operation executed lastly before the second operation is started.

5. The controller according to claim 1, wherein the lean vehicle (1) has a stepped transmission (12), and the execution section (32) changes the reference speed based on a gear stage information of the transmission (12).

6. The controller according to claim 1, wherein the execution section (32) changes the reference speed based on a travel posture information of the lean vehicle (1).

7. The controller according to claim 6, wherein the travel posture information includes a lean angle information of the lean vehicle (1).

8. The controller according to claim 1, wherein the execution section (32) changes the reference speed based on a road surface information.

9. The controller according to claim 8, wherein the road surface information includes gradient information of a road surface.

10. The controller according to claim 1, wherein the execution section (32) changes the reference speed based on at least one of an occupant information and a loaded article information of the lean vehicle (1).

11. The controller according to claim 1, wherein the execution section (32) executes, instead of the second operation, an operation that applies an automatic emergency braking to the lean vehicle (1) when a collision possibility information of the lean vehicle (1), which is acquired during the second operation, indicates that the collision possibility of the lean vehicle (1) exceeds a reference degree.

12. A control method for maneuvering a lean vehicle (1), the control method comprising:

executing, using an execution section (32) of a controller (30), a first operation as an operation that causes the lean vehicle (1) to execute a cruise control based on a positional relationship information between the lean vehicle (1) and a preceding vehicle preceding the lean vehicle (1), wherein when a speed information, which is information about a speed of the lean vehicle (1) and acquired during the first operation, indicates that the lean vehicle (1) is decelerated to a reference speed, the execution section (32) executes, instead of the first operation, a second operation as an operation that causes the lean vehicle (1) to execute the cruise control regardless of the positional relationship information.

* * * * *